(12) United States Patent
Nasir et al.

(10) Patent No.: US 8,849,253 B2
(45) Date of Patent: Sep. 30, 2014

(54) LOCATION-BASED PROXIMITY NOTIFICATION

(75) Inventors: Azim Nasir, Foxboro, MA (US); Afshin Moshrefi, Newburyport, MA (US); Nader Gharachorloo, Ossining, NY (US); Hong Xiao, Acton, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 20 days.

(21) Appl. No.: 13/315,681

(22) Filed: Dec. 9, 2011

(65) Prior Publication Data

US 2013/0150088 A1    Jun. 13, 2013

(51) Int. Cl.
*H04M 1/725*  (2006.01)
*H04M 11/04*  (2006.01)
*H04W 24/00*  (2009.01)

(52) U.S. Cl.
USPC ............... 455/412.2; 455/456.6; 455/456.3; 455/404.1

(58) Field of Classification Search
CPC .......... H04W 4/12; H04W 4/02; H04W 4/025
USPC ............. 455/412.2, 456.6, 456.3, 404.1
See application file for complete search history.

(56) References Cited

U.S. PATENT DOCUMENTS

| | | | |
|---|---|---|---|
| 2008/0032703 A1* | 2/2008 | Krumm et al. | 455/456.1 |
| 2009/0319172 A1* | 12/2009 | Almeida et al. | 701/201 |
| 2011/0121966 A1* | 5/2011 | Cavanaugh | 340/539.13 |
| 2012/0289254 A1* | 11/2012 | Dishneau | 455/456.3 |

* cited by examiner

*Primary Examiner* — Omoniyi Obayanju

(57) ABSTRACT

A user device may receive selection of a type of a location-based proximity notification, and may receive a device parameter, a message parameter, and a location parameter for the selected notification type. The user device may detect that the user device is proximate to a location defined by the location parameter, and may provide a proximity notification message, defined by the message parameter, to a device defined by the device parameter, when the user device is proximate to the location.

17 Claims, 14 Drawing Sheets

LOCATION-BASED PROXIMITY NOTIFICATION

BACKGROUND

A user of a mobile communication device (e.g., cell phones, smart phones, etc.) may place a call to another party to inform the other party how far the user is located from the other party or from a particular location. For example, a wife may call her husband to inform her husband as to where the wife is located and how much longer it should take her to arrive. In another example, a user may call a friend to ask how far away the friend is from a particular destination, such as a location of an event. In still another example, service personnel may be asked to call a home prior to their arrival at the home. However, people often forget to notify parties about how far away they are from the parties and/or particular locations.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a user to create, via a user device (e.g., a mobile computation and communication device), a notification that is customized to particular devices and/or media based on a location of the user device and other notification parameters. For example, the notification may be generated when the user device is at or near a particular location, such as within a particular number of miles of a location. The notification may be generated with a particular frequency, such as daily, at a particular time, as a one time event, etc., and may be coordinated with a calendar function provided by the user device. The notification may be in the form of a short message service (SMS) or text message, a call to a landline phone, a call to a mobile device, an email message, a message provided to a set-top box (STB) and/or a television, a message provided to a gaming device or system, a post to a social network web site, an automatic call to a device, etc. The notification may be provided in a textual format, an audio format, and/or a video format to one or more devices, email addresses, and/or media.

In one example implementation, a user device, such as a mobile computation and communication device, may receive selection of a notification type (e.g., a call, a text message, an email message, etc.), and may receive a device/medium parameter, a message parameter, a time parameter, and a location parameter for the selected notification type. The user device may detect when the user device is at or near a location defined by the location parameter, and may determine whether a current time is specified by the time parameter. The user device may provide a notification type message, to the device/medium specified by the device/medium parameter, when the user device is at or near the location and the current time is specified by the time parameter.

As used herein, the term "user" is intended to be broadly interpreted to include a user device or a user of a user device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
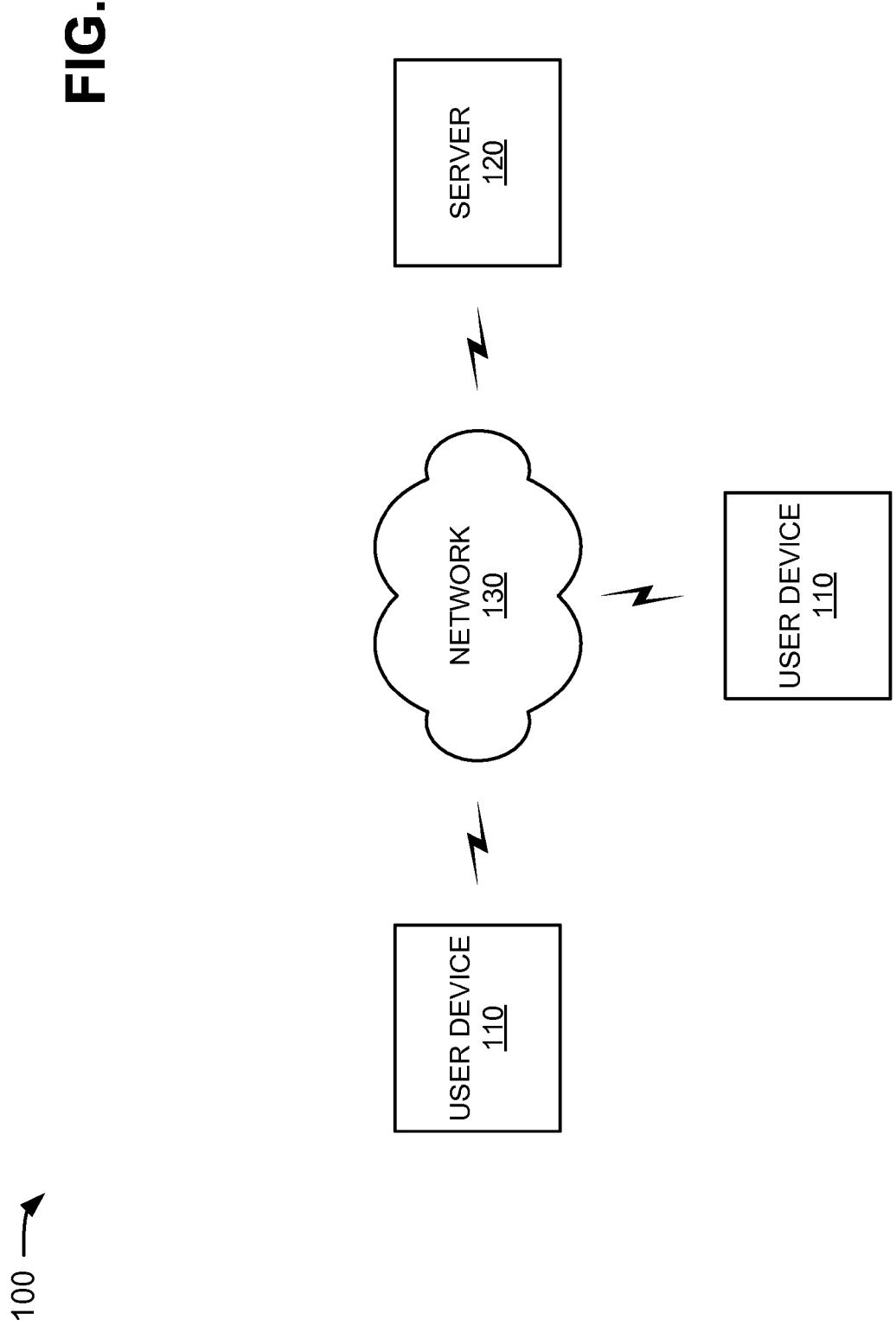
FIG. 1 is a diagram of an example network in which systems and/or methods described herein may be implemented.

FIG. 1 is a diagram of an example network 100 in which systems and/or methods described herein may be implemented. As illustrated, network 100 may include one or more user devices 110, a server 120, and a network 130. Devices and/or networks of network 100 may interconnect via wired and/or wireless connections. Two user devices 110, one server 120, and one network 130 have been illustrated in FIG. 1 for simplicity. In practice, there may be more user devices 110, servers 120, and/or networks 130.

User device 110 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; a gaming system; a global positioning system (GPS) device; a set-top box (STB), a television, or other types of computation and communication devices. In one example, user device 110 may include a mobile computation and communication device that is capable of communicating with the other user device 110 (e.g., which may be a fixed or mobile user device) and/or server 120 via network 130.

Server 120 may include one or more server devices, or other types of computation or communication devices, that gather, process, search, and/or provide information in a manner described herein. In one example implementation, server 120 may include one or more devices that are capable of providing a notification application to user devices 110, via network 130. Server 120 may receive notification parameters associated with a notification to be provided from one user device 110 to another user device 110, such as when the one user device 110 is located at or near a particular location.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more other tasks described as being performed by one or more other devices/networks of network 100.

Figure 2:
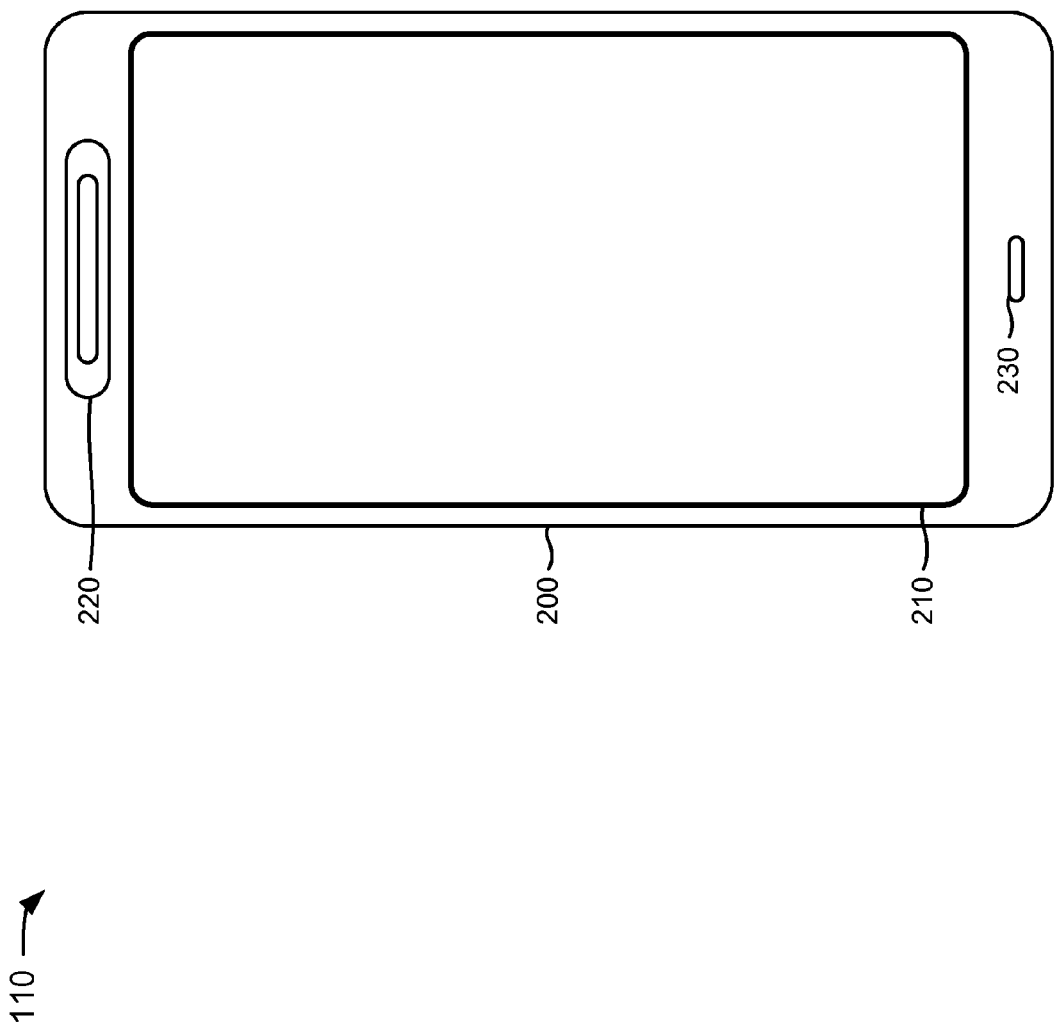
FIG. 2 is a diagram of example external components of a user device of the network depicted in FIG. 1.

FIG. 2 is a diagram of example external components of user device 110. As shown, user device 110 may include a housing 200, a display 210, a speaker 220, and/or a microphone 230.

Housing 200 may protect the components of user device 110 from outside elements. Housing 200 may include a structure configured to hold devices and components used in user device 110, and may be formed from a variety of materials. For example, housing 200 may be formed from plastic, metal, a composite, etc., and may be configured to support display 210, speaker 220, and/or microphone 230.

Display 210 may provide visual information to the user. For example, display 210 may display text input into user device 110, text, images, video, and/or graphics received from another device, and/or information regarding incoming or outgoing calls or text messages, emails, media, games, phone books, address books, the current time, etc. In one implementation, display 210 may include a touch screen display that may be configured to receive a user input when the user touches display 210. For example, the user may provide an input to display 210 directly, such as via the user's finger, or via other input objects, such as a stylus. User inputs received via display 210 may be processed by components and/or devices operating in user device 110. The touch screen display may permit the user to interact with user device 110 in order to cause user device 110 to perform one or more operations.

Speaker 220 may provide audible information to a user of user device 110. Speaker 220 may be located in an upper portion of user device 110, and may function as an ear piece when a user is engaged in a communication session using user device 110. Speaker 220 may also function as an output device for music and/or audio information associated with games and/or video images played on user device 110.

Microphone 230 may receive audible information from the user. Microphone 230 may include a device that converts speech or other acoustic signals into electrical signals for use by user device 110. Microphone 230 may be located proximate to a lower side of user device 110.

Although FIG. 2 shows example components of user device 110, in other implementations, user device 110 may contain fewer components, different components, differently arranged components, or additional components than depicted in FIG. 2. Alternatively, or additionally, one or more components of user device 110 may perform one or more other tasks described as being performed by one or more other components of user device 110.

Figure 3:
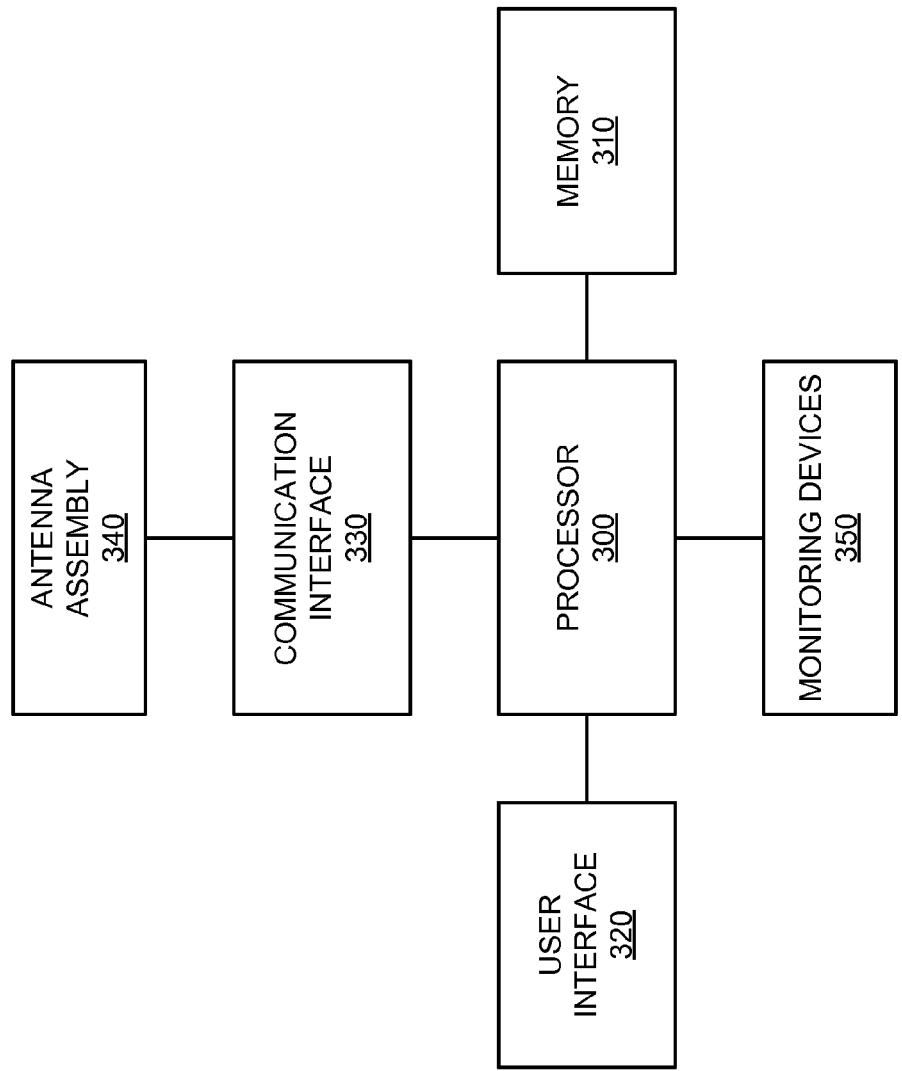
FIG. 3 is a diagram of example internal components of the user device of FIG. 2.

FIG. 3 is an example diagram of internal components of user device 110. As illustrated, user device 110 may include a processor 300, memory 310, a user interface 320, a communication interface 330, and/or an antenna assembly 340.

Processor 300 may include one or more processors or microprocessors that interpret and execute instructions. In other implementations, processor 300 may be implemented as or include one or more ASICs, FPGAs, or the like.

Memory 310 may include a RAM or another type of dynamic storage device that stores information and instructions for execution by processor 300, a ROM or another type of static storage device that stores static information and instructions for processor 300, and/or some other type of magnetic or optical recording medium and its corresponding drive for storing information and/or instructions.

User interface 320 may include mechanisms for inputting information to user device 110 and/or for outputting information from user device 110. Examples of input and output mechanisms might include buttons (e.g., control buttons, keys of a keypad, a joystick, etc.) or a touch screen interface (e.g., display 210) to permit data and control commands to be input into user device 110; a speaker (e.g., speaker 220) to receive electrical signals and output audio signals; a microphone (e.g., microphone 230) to receive audio signals and output electrical signals; a display (e.g., display 210) to output visual information (e.g., text input into user device 110); a vibrator to cause user device 110 to vibrate; etc.

Communication interface 330 may include, for example, a transmitter that may convert baseband signals from processor 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network.

Each of monitoring devices 350 may include one or more devices that measure movement of user device 110, a location of user device 110, a direction of user device 110, etc. For example, monitoring device 350 may include an accelerometer, a Doppler receiver, a GPS receiver, a gyroscope, a compass, etc. A GPS device may measure the location of user device 110, such latitude and longitude coordinates associated with user device 110. In one example, the GPS device may be used to determine a velocity of user device 110 based on locations of user device 110 over time. For example, user device 110 may be provided at a first location at a first time, and may be provided at a second location at a second time. The distance between the first and second locations and the difference between the first and second times may be used to calculate a velocity of user device 110. An accelerometer, a gyroscope, a compass, etc. may measure an orientation or a direction (e.g., tilted, turned, pointing to the north, south, east, west, etc.) of user device 110.

As described herein, user device 110 may perform certain operations in response to processor 300 executing software instructions contained in a computer-readable medium, such as memory 310. A computer-readable medium may be defined as a non-transitory memory device. A memory device may include space within a single physical memory device or spread across multiple physical memory devices. The software instructions may be read into memory 310 from another computer-readable medium, or from another device via communication interface 330. The software instructions contained in memory 310 may cause processor 300 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of user device 110, in other implementations, user device 110 may contain fewer components, different components, differently arranged components, or additional components than depicted in FIG. 3. Alternatively, or additionally, one or more components of user device 110 may perform one or more other tasks described as being performed by one or more other components of user device 110.

Figure 4:
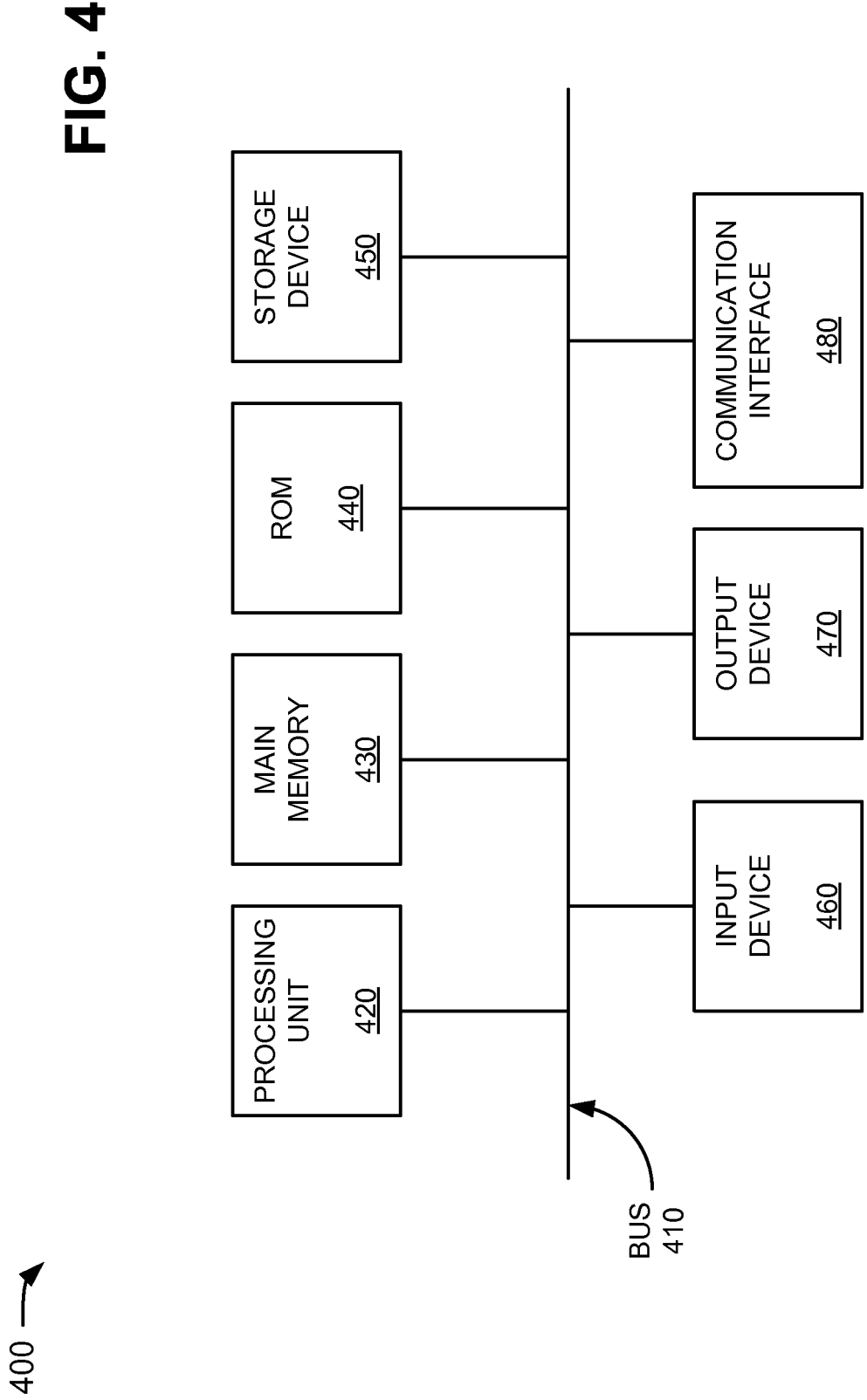
FIG. 4 is a diagram of example components of one or more devices of the network depicted in FIG. 1.

FIG. 4 is a diagram of example components of a device 400 that may correspond to one or more devices of network 100 (FIG. 1). In one example implementation, one or more of the devices of network 100 may include one or more devices 400 or one or more components of device 400. As illustrated, device 400 may include a bus 410, a processing unit 420, a main memory 430, a ROM 440, a storage device 450, an input device 460, an output device 470, and/or a communication interface 480. Bus 410 may include a path that permits communication among the components of device 400.

Processing unit 420 may include one or more processors, microprocessors, or other types of processing units that may interpret and execute instructions. Main memory 430 may include a RAM or another type of dynamic storage device that may store information and instructions for execution by processing unit 420. ROM 440 may include a ROM device or another type of static storage device that may store static information and/or instructions for use by processing unit 420. Storage device 450 may include a magnetic and/or optical recording medium and its corresponding drive.

Input device 460 may include a mechanism that permits an operator to input information to device 400, such as a keyboard, a mouse, a pen, a microphone, voice recognition and/or biometric mechanisms, etc. Output device 470 may include a mechanism that outputs information to the operator, including a display, a printer, a speaker, etc. Communication interface 480 may include any transceiver-like mechanism that enables device 400 to communicate with other devices and/or systems. For example, communication interface 480 may include mechanisms for communicating with another device or system via a network.

As described herein, device 400 may perform certain operations in response to processing unit 420 executing software instructions contained in a computer-readable medium, such as main memory 430. The software instructions may be read into main memory 430 from another computer-readable medium or from another device via communication interface 480. The software instructions contained in main memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may include fewer components, different components, differently arranged components, or additional components than depicted in FIG. 4. Alternatively, or additionally, one or more components of device 400 may perform one or more other tasks described as being performed by one or more other components of device 400.

Figure 5:
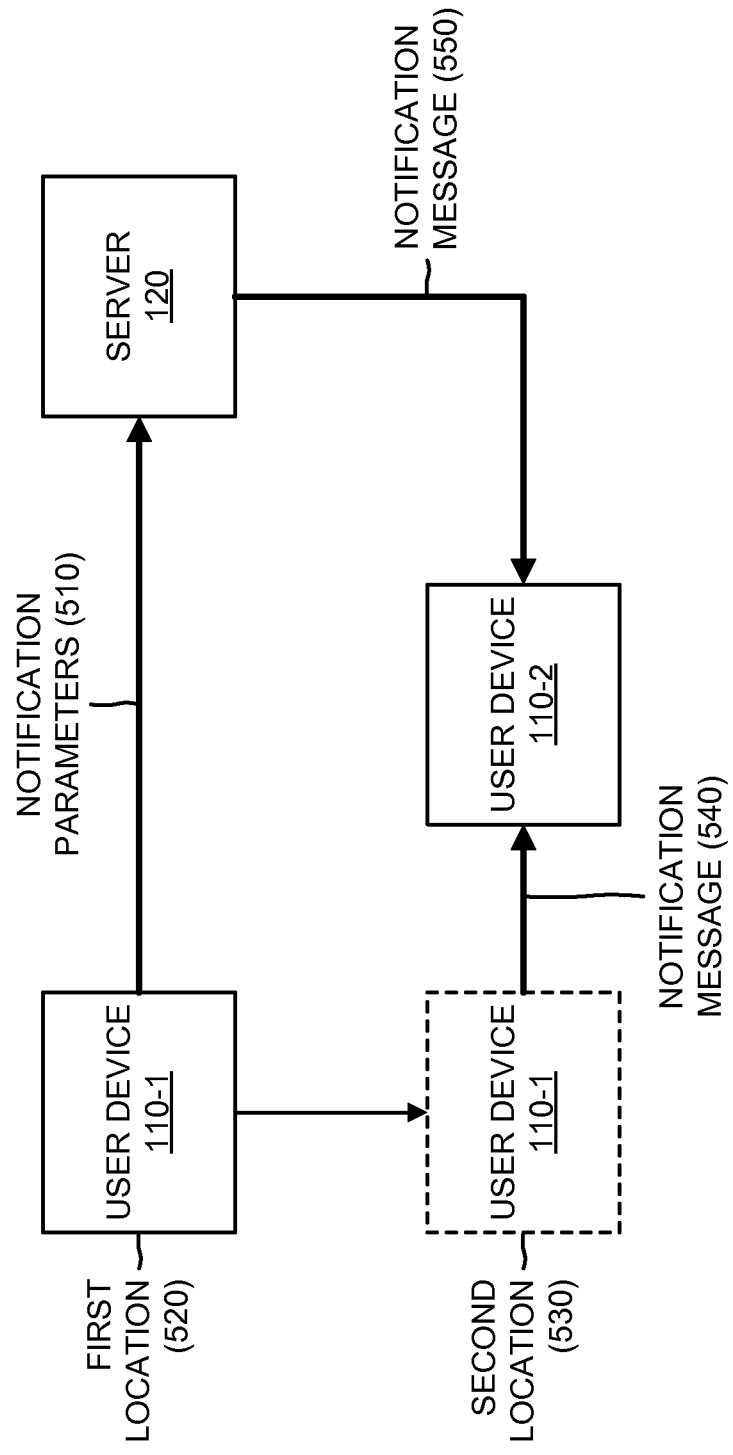
FIG. 5 is a diagram of example operations capable of being performed by an example portion of the network depicted in FIG. 1.

FIG. 5 is a diagram of example operations capable of being performed by an example portion 500 of network 100 (FIG. 1). As shown, network portion 500 may include two user devices 110-1 and 110-2, and server 120. User devices 110 and server 120 may include the features described above in connection with, for example, one or more of FIGS. 1-4. In one example, user device 110-1 may be a mobile user device 110, and user device 110-2 may be a mobile or a fixed user device 110.

Although not shown in FIG. 5, user devices 110 may download a location-based proximity notification application from server 120, and the application may be installed on user devices 110. In one example, the application may include a mobile application that enables a user to create, via user device 110, a notification that is customized to particular devices and/or media based on a location of user device 110 and other notification parameters. The application may enable the user to select a type of notification to be provided, such as a SMS or a text message, a call to a landline phone, a call to a mobile device, an email message, a message provided to a STB and/or a television, a message provided to a gaming device or system, a post to a social network web site, etc.

In one example implementation, the application may enable the user to input notification parameters 510 to user device 110-1, and user device 110-1 may receive and store notification parameters 510. Alternatively, or additionally, the application may enable the user to provide, via user device 110-1, notification parameters 510 to server 120. For example, in such an arrangement, the application may be a web-based application provided by server 120. User device 110-1 may access the web-based application, provided by server 120, and may provide notification parameters 510 to server 120 (e.g., for storage) via the web-based application. Notification parameters 510 may include a device/medium parameter, a message parameter, a time or frequency parameter, a location parameter, etc. The device/medium parameter may include information specifying one or more devices (e.g., a mobile telephone, a landline telephone, a STB, a television, etc.) or one or more media (e.g., an email system, a social network, etc.) to which a notification is to be provided. The message parameter may include one or more messages (e.g., in a textual format, an audio format, and/or a video format) to be provided in the notification. For example, the message parameter may state that user device 110-1 is a particular amount of time from a location, is a particular distance from a location, etc.

The time parameter may include a particular frequency (e.g., daily, at a particular time, as a one time event, continuously or near continuously, such as every few minutes, etc.) with which the notification may be generated. In one example, the time parameter may be set based on calendar information (e.g., a person is coming to visit on a particular date) stored in a calendar application of user device 110-1. The location parameter may include a location (e.g., a home, a place of work, a travel destination, etc.) or a proximity to a location, such as within a particular number of miles of a location or within a particular amount of travel time from a location. In one example, the location parameter may be retrieved from a location that was previously saved by user device 110-1 or from a location stored in an address book application of user device 110-1.

As further shown in FIG. 5, user device 110-1 may be provided at a first location 520 when notification parameters 510 are input to user device 110-1 and provided to server 120. In one example, the location parameter of notification parameters 510 may define a second location 530 as a location when a notification should be generated. The device/medium parameter of notification parameters 510 may identify user device 110-2 as a device to receive the generated notification. When user device 110-1 moves to second location 530, user device 110-1 may determine whether user device 110-1 is located at or near second location 530 (e.g., based on GPS coordinates associated with user device 110-1) at a current time (e.g., a time of a day, a day of the week, a particular date, etc.). User device 110-1 may determine whether the current time is specified by the time parameter of notification parameters 510. For example, if the time parameter specifies a Monday and the current time is 11:30 AM on Monday, user device 110-1 may determine that the current time is specified by the time parameter. When user device 110-1 is at or near second location 530 and the current time is specified by the time parameter, user device 110-1 may provide a notification message 540 to user device 110-2 via a medium (e.g., a text, a phone call, an email, etc.) specified by the device/medium parameter. Notification message 540 may include a message specified by the message parameter of notification parameters 510.

Alternatively, or additionally, when user device 110-1 moves to second location 530, server 120 may determine whether user device 110-1 is located at or near second location 530 (e.g., based on GPS coordinates associated with user device 110-1) at a current time (e.g., a time of a day, a day of the week, a particular date, etc.). Server 120 may determine whether the current time is specified by the time parameter of notification parameters 510. For example, if the time parameter specifies Mar. 25, 2011 and the current time is 9:30 AM on Mar. 25, 2011, server 120 may determine that the current time is specified by the time parameter. When user device 110-1 is at or near second location 530 and the current time is specified by the time parameter, server 120 may provide a notification message 550 to user device 110-2 via a medium (e.g., a social network post, a television message, etc.). Notification message 550 may include a message specified by the message parameter of notification parameters 510.

In one example implementation, one or more different notification messages may be provided to one or more different user devices 110, or the same notification message may be provided to one or more different user devices 110. Alternatively, or additionally, user device 110-1 may permit user device 110-2 to track a location of user device 110-1 so that user device 110-2 may determine when user device 110-1 is located at second location 530. In such an arrangement, user device 110-1 and/or server 120 may or may not provide notification messages 530 and 540 to user device 110-2.

Although FIG. 5 shows example components of network portion 500, in other implementations, network portion 500 may include fewer components, different components, differently arranged components, or additional components than depicted in FIG. 5. Additionally, or alternatively, one or more components of network portion 500 may perform one or more other tasks described as being performed by one or more other components of network portion 500.

Figure 6:
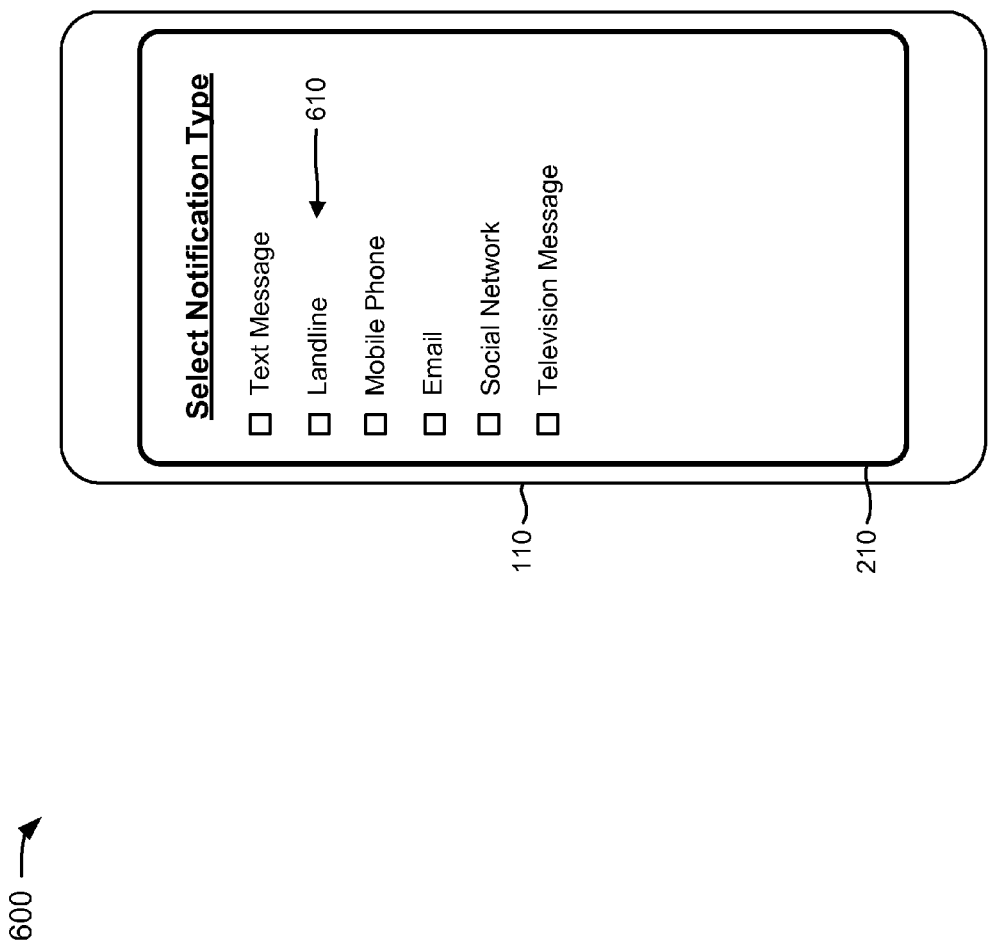
FIG. 6 is a diagram of an example notification type selection user interface that may be generated or provided by the user device.

FIG. 6 is a diagram of an example notification type selection user interface 600 that may be generated or provided by user device 110. User interface 600 depicted in FIG. 6, as well as the user interfaces depicted in FIGS. 7-12 (hereinafter referred to collectively as "the user interfaces") may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices (e.g., display 210, FIG. 2), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of user device 110 (e.g., via a touch screen display, a mouse, a keyboard, a keypad, voice commands, etc.).

As shown in FIG. 6, user interface 600 may enable a user to select one or more different notification types 610. Notification types 610 may include a text message to a fixed or mobile device, a call to a landline device, a call to a mobile phone, an email message, a social network post, a television message, etc. The user may select one or more notification types 610, and user device 110 may then instruct the user to provide one or more parameters for the selected one or more notification types 610.

Figure 7:
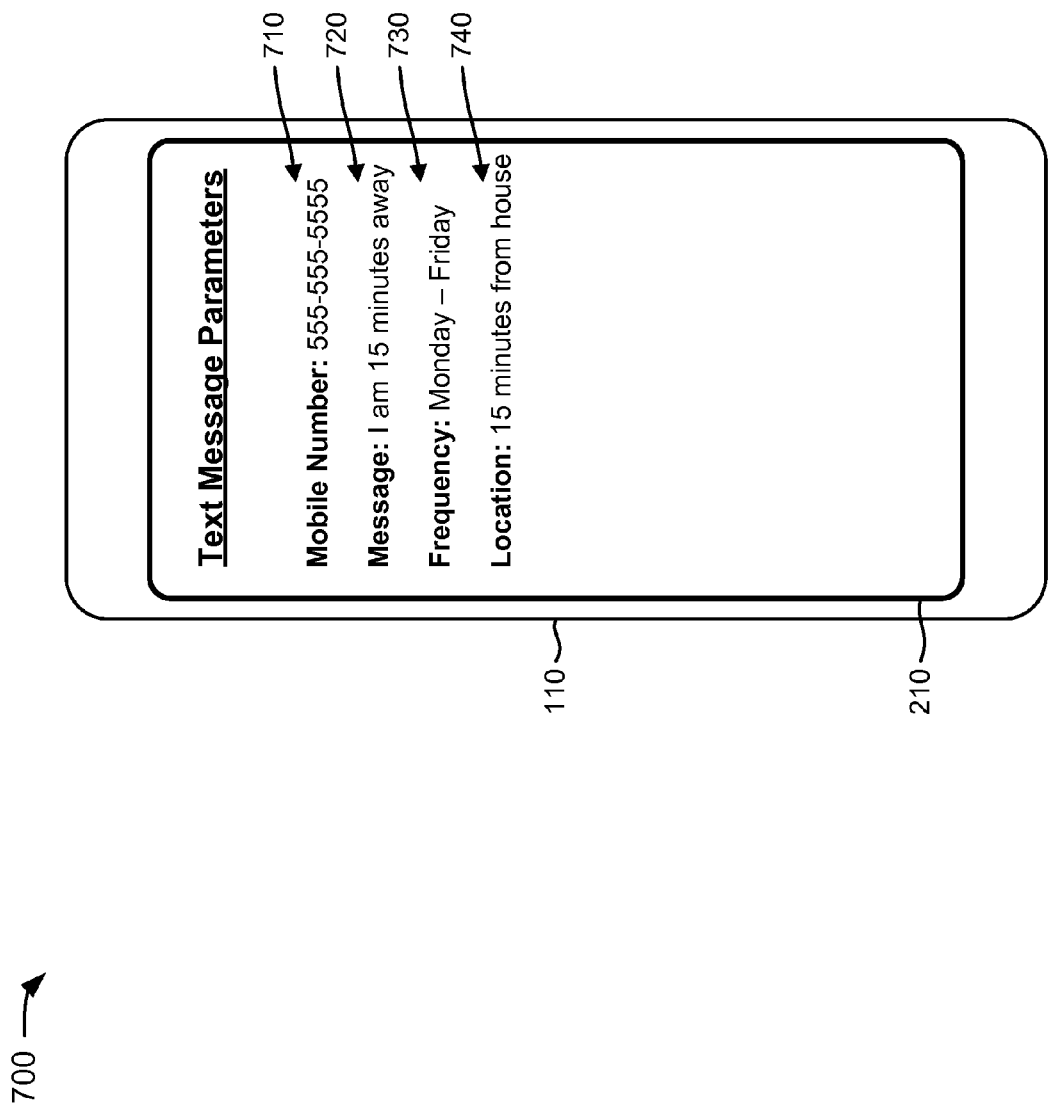
FIG. 7 is a diagram of an example text message notification user interface that may be generated or provided by the user device.

For example, if the user selects a text message from notification types 610, user device 110 may display a text message notification user interface to the user. FIG. 7 is a diagram of an example text message notification user interface 700 that may be generated or provided by user device 110. User interface 700 may request that the user input one or more text message parameters to user device 110. For example, user interface 700 may request that the user input a mobile number 710 (e.g., "555-555-5555") for the text message notification, and may request that the user input a message 720 (e.g., "I am 15 minutes away") for the text message notification. User interface 700 may also request that the user input a frequency 730 (e.g., "Monday-Friday") for the text message notification, and may request that the user input a location 740 (e.g., "15 minutes from house") associated with the text message notification. When user device 110 is located 15 minutes from the user's house on Monday through Friday, the text message parameters of user interface 700 may cause user device 110 to send message 720, via a text message, to a mobile device associated with mobile number 710. For example, a husband may utilize the text message parameters of user interface 700 to notify his wife that he is almost home from work during the work week.

Figure 8:
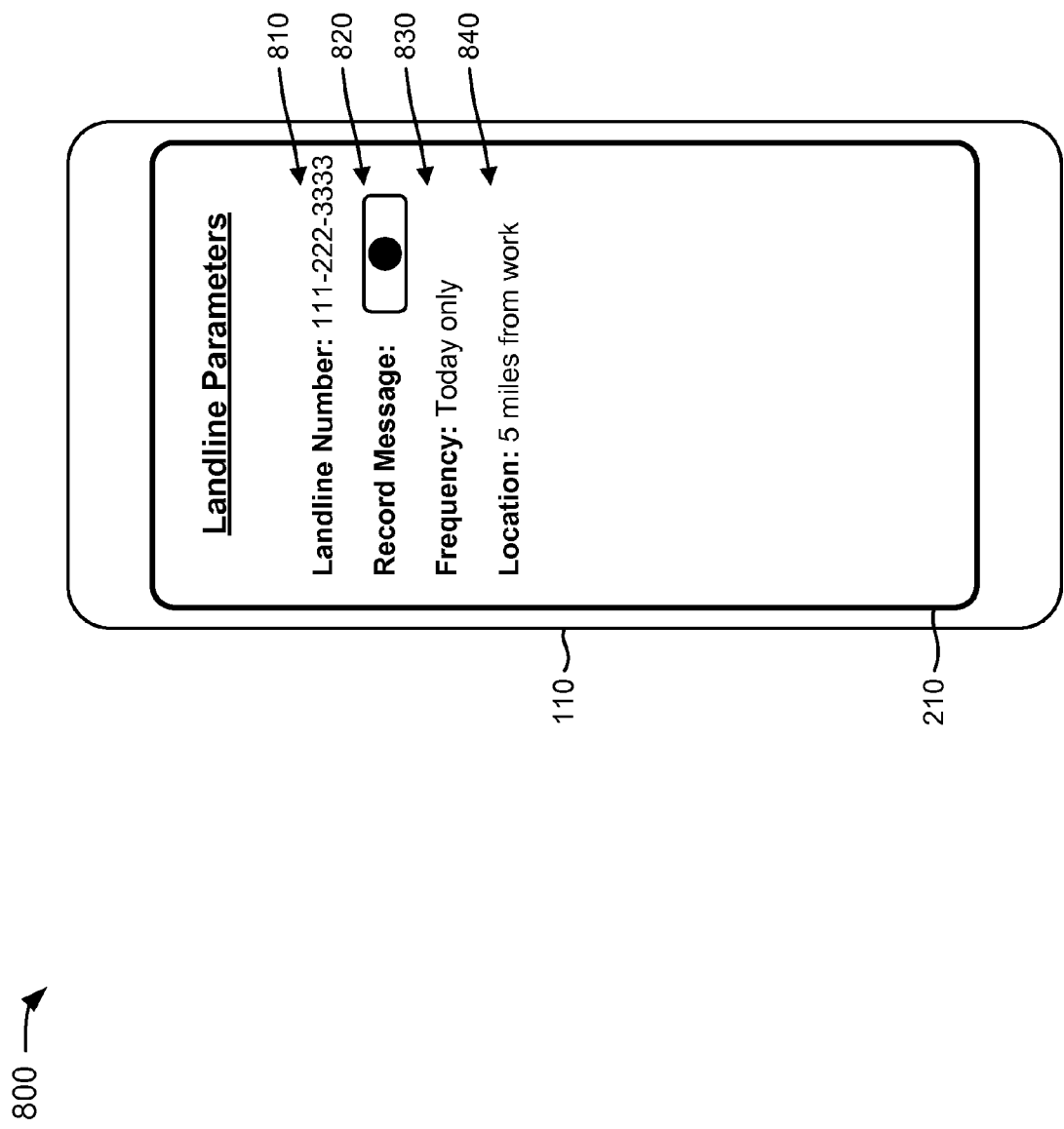
FIG. 8 is a diagram of an example landline notification user interface that may be generated or provided by the user device.

If the user selects a landline call from notification types 610, user device 110 may display a landline notification user interface to the user. FIG. 8 is a diagram of an example landline notification user interface 800 that may be generated or provided by user device 110. User interface 800 may request that the user input one or more landline parameters to user device 110. For example, user interface 800 may request that the user input a landline number 810 (e.g., "111-222-3333") for the landline notification, and may request that the user record (e.g., via microphone 230, FIG. 2) a message 820 (e.g., "I am 5 miles from work") for the landline notification. User interface 800 may also request that the user input a frequency 830 (e.g., "Today only") for the landline notification, and may request that the user input a location 840 (e.g., "5 miles from work") associated with the landline notification. When user device 110 is located 5 miles from the user's work on a particular day, the landline parameters of user interface 800 may cause user device 110 to send the recorded message 820, via a telephone call, to a landline device associated with landline number 810. For example, a worker may utilize the landline parameters of user interface 800 to notify co-workers that the worker is almost at a work location.

Figure 9:
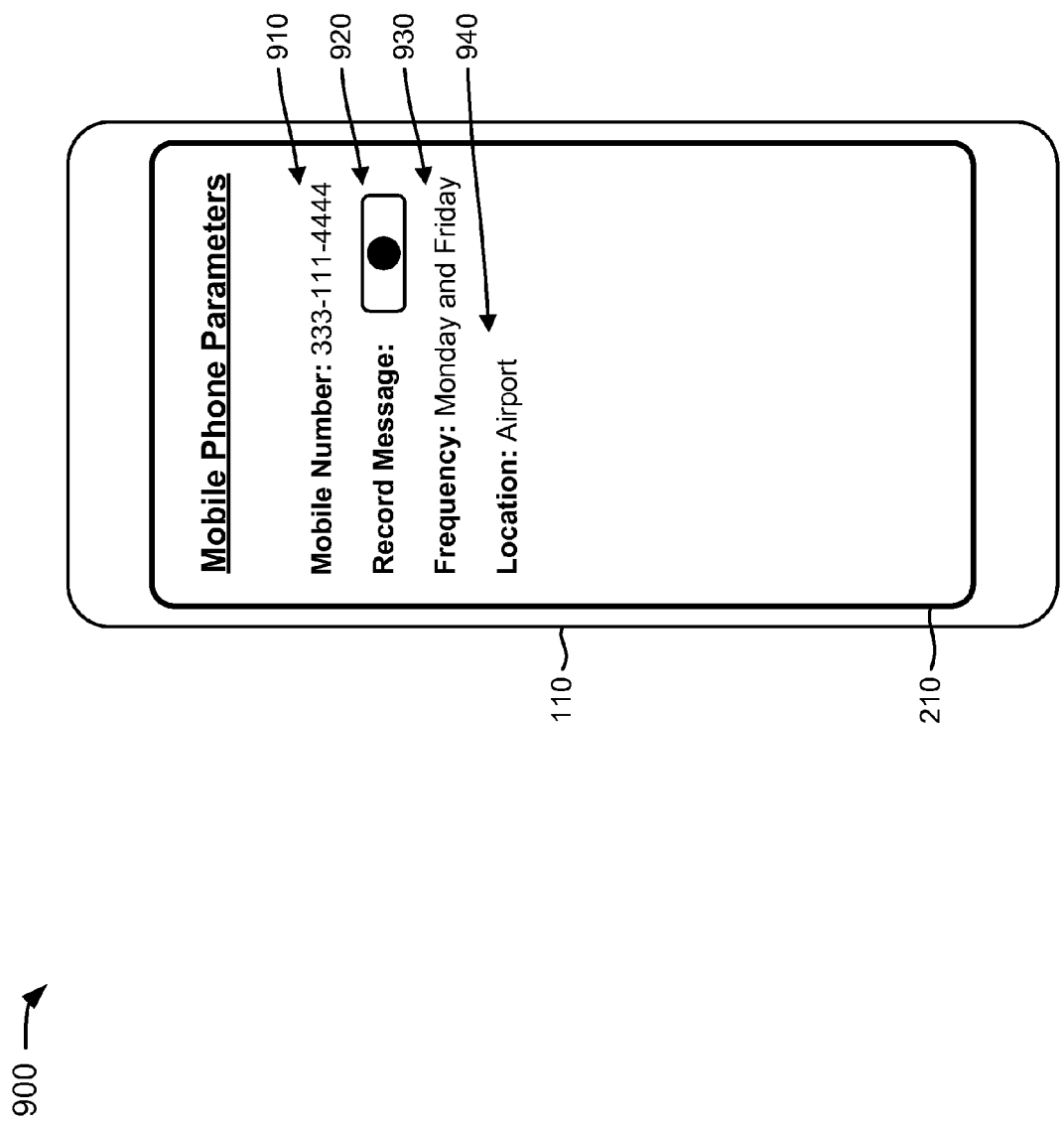
FIG. 9 is a diagram of an example mobile phone notification user interface that may be generated or provided by the user device.

If the user selects a mobile phone call from notification types 610, user device 110 may display a mobile phone notification user interface to the user. FIG. 9 is a diagram of an example mobile phone notification user interface 900 that may be generated or provided by user device 110. User interface 900 may request that the user input one or more mobile phone parameters to user device 110. For example, user interface 900 may request that the user input a mobile number 910 (e.g., "333-111-4444") for the mobile phone notification, and may request that the user record (e.g., via microphone 230, FIG. 2) a message 920 (e.g., "I made it to the airport") for the mobile phone notification. User interface 900 may also request that the user input a frequency 930 (e.g., "Monday and Friday") for the mobile phone notification, and may request that the user input a location 940 (e.g., "Airport") associated with the mobile phone notification. When user device 110 is located at or near an airport on Monday or Friday, the mobile phone parameters of user interface 900 may cause user device 110 to send the recorded message 920, via a telephone call, to a mobile device associated with mobile number 910. For example, a daughter may utilize the mobile phone parameters of user interface 900 to notify her father that she has safely arrived at the airport.

Figure 10:
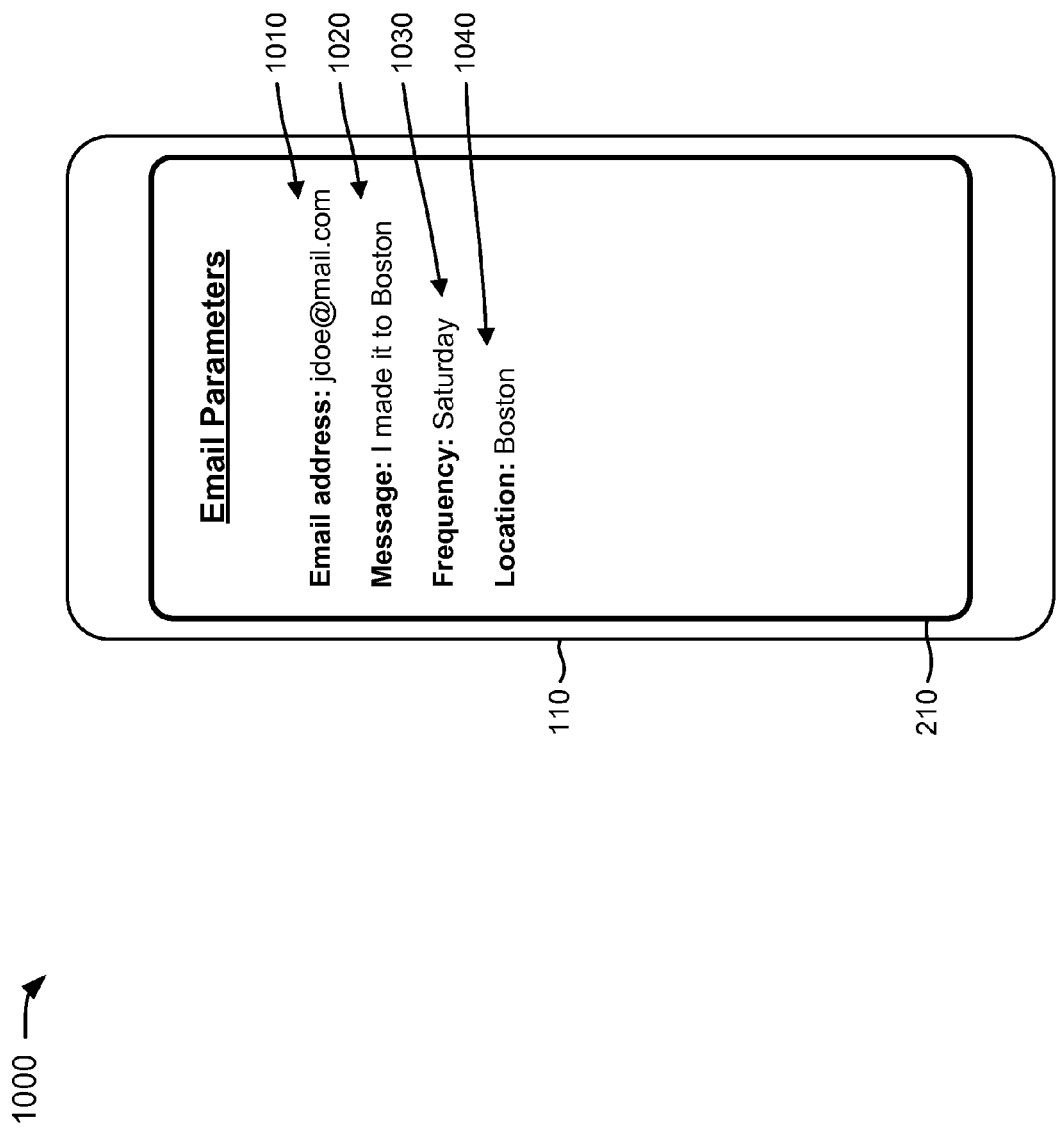
FIG. 10 is a diagram of an example email notification user interface that may be generated or provided by the user device.

If the user selects an email message from notification types 610, user device 110 may display an email notification user interface to the user. FIG. 10 is a diagram of an example email notification user interface 1000 that may be generated or provided by the user device 110. User interface 1000 may request that the user input one or more email parameters to user device 110. For example, user interface 1000 may request that the user input an email address 1010 (e.g., "jdoe@mail.com") for the email notification, and may request that the user input a message 1020 (e.g., "I made it to Boston") for the email notification. User interface 1000 may also request that the user input a frequency 1030 (e.g., "Saturday") for the email notification, and may request that the user input a location 1040 (e.g., "Boston") associated with the email notification. When user device 110 is located at or near Boston on Saturday, the email parameters of user interface 1000 may cause user device 110 to send message 1020, via an email message, to email address 1010. For example, a brother may utilize the email parameters of user interface 1000 to notify his sister that he has safely arrived at Boston.

Figure 11:
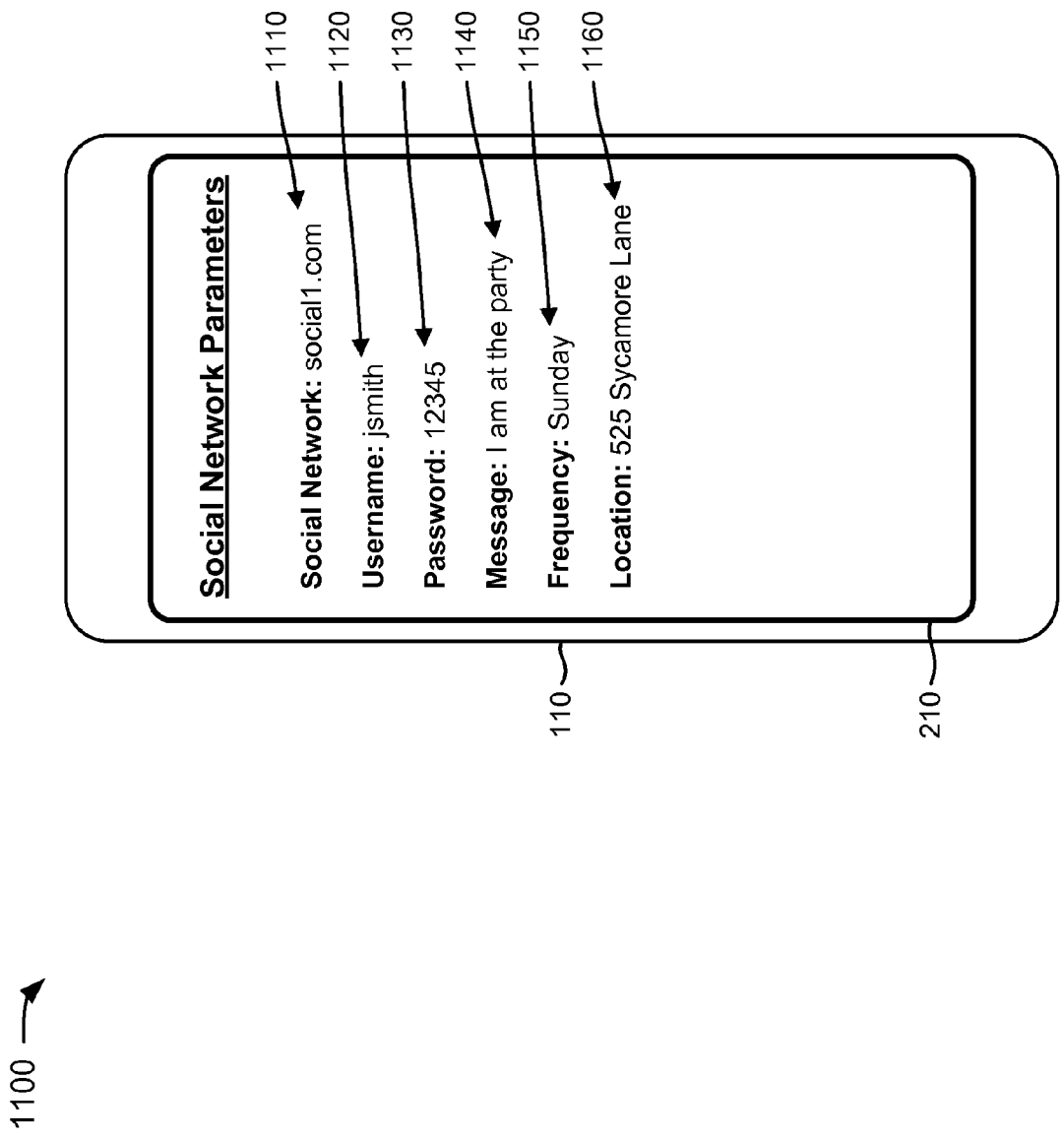
FIG. 11 is a diagram of an example social network notification user interface that may be generated or provided by the user device.

If the user selects a social network post from notification types 610, user device 110 may display a social network notification user interface to the user. FIG. 11 is a diagram of an example social network notification user interface 1100 that may be generated or provided by user device 110. User interface 1100 may request that the user input one or more social network parameters to user device 110. For example, user interface 1100 may request that the user input a social network web site address 1110 (e.g., "social1.com") for the social network notification, and may request that the user input a social network username 1120 (e.g., "jsmith") and a social network password 1130 (e.g., "12345") for the social network notification. User interface 1100 may also request that the user input a message 1140 (e.g., "I am at the party") for the social network notification. User interface 1100 may request that the user input a frequency 1150 (e.g., "Sunday") for the social network notification, and may request that the user input a location 1160 (e.g., "525 Sycamore Lane") associated with the social network notification. When user device 110 is located at or near 525 Sycamore Lane on Sunday, the social network parameters of user interface 1100 may cause user device 110 to login to the social network, with username 1120 and password 1130, and to post message 1140 to the user's social network account. For example, a friend may utilize the social network parameters of user interface 1100 to notify other friends that the friend arrived at a party located at 525 Sycamore Lane.

Figure 12:
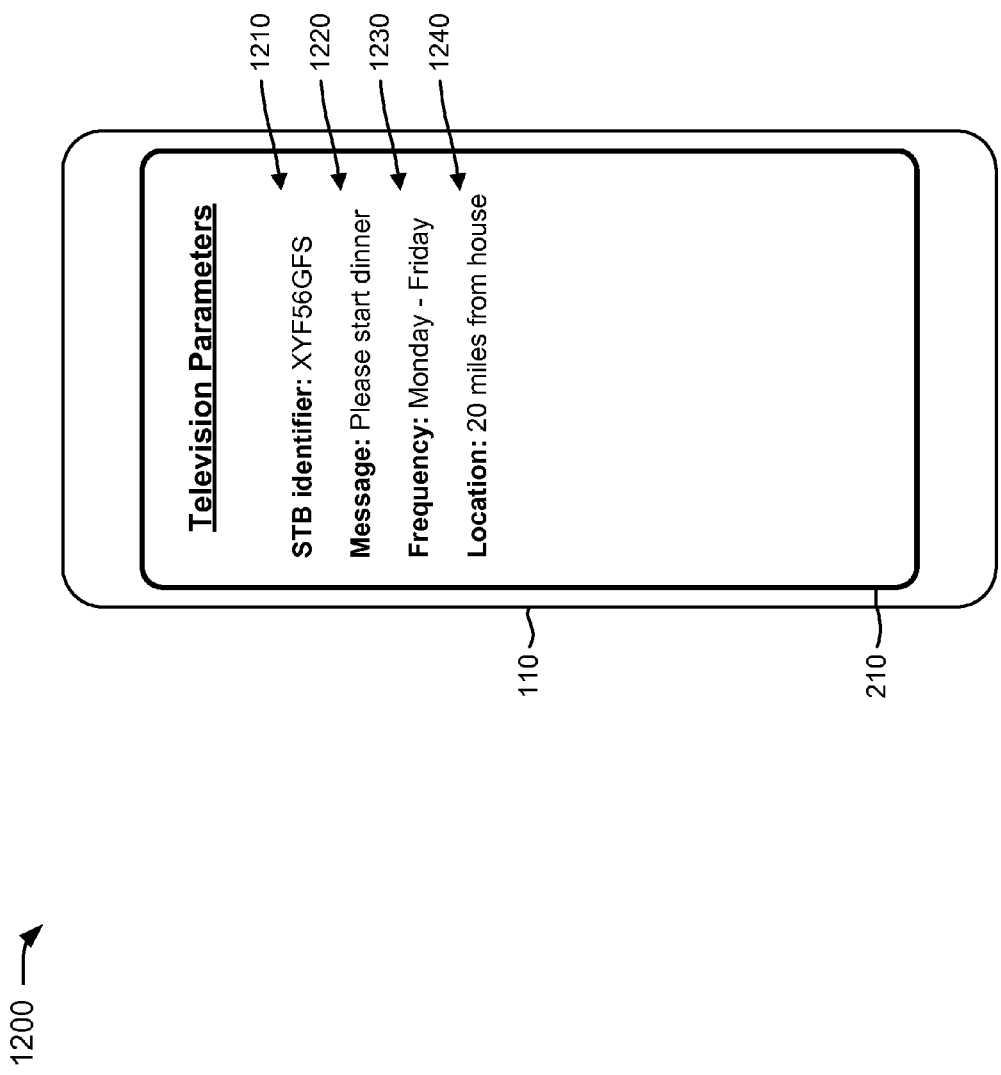
FIG. 12 is a diagram of an example television notification user interface that may be generated or provided by the user device.

If the user selects a television message from notification types 610, user device 110 may display a television notification user interface to the user. FIG. 12 is a diagram of an example television notification user interface 1200 that may be generated or provided by user device 110. User interface 1200 may request that the user input one or more television parameters to user device 110. For example, user interface 1200 may request that the user input a STB identifier 1210 (e.g., "XYF56GFS") for the television notification, and may request that the user input a message 1220 (e.g., "Please start dinner") for the television notification. User interface 1200 may also request that the user input a frequency 1230 (e.g., "Monday-Friday") for the television notification, and may request that the user input a location 1240 (e.g., "20 miles from house") associated with the television notification. When user device 110 is located 20 miles from the user's house on Monday through Friday, the television parameters of user interface 1200 may cause user device 110 to send message 1220 to a STB associated with STB identifier 1210. The STB, in turn, may display message 1220 on a television associated with the STB. For example, a wife may utilize the television parameters of user interface 1200 to ask her husband to start dinner when the wife is 20 miles from home.

Although the user interfaces of FIGS. 6-12 depict a variety of information, in other implementations, the user interfaces may depict less information, different information, differently arranged information, and/or additional information than depicted in FIGS. 6-12. In one example implementation, microphone 230 (FIG. 2) may be utilized by the user of user device 110 to provide voice commands to the location-based proximity notification application. The voice commands may be used in place of and/or in addition to the user inputs described above in connection with FIGS. 6-12.

Figure 13:
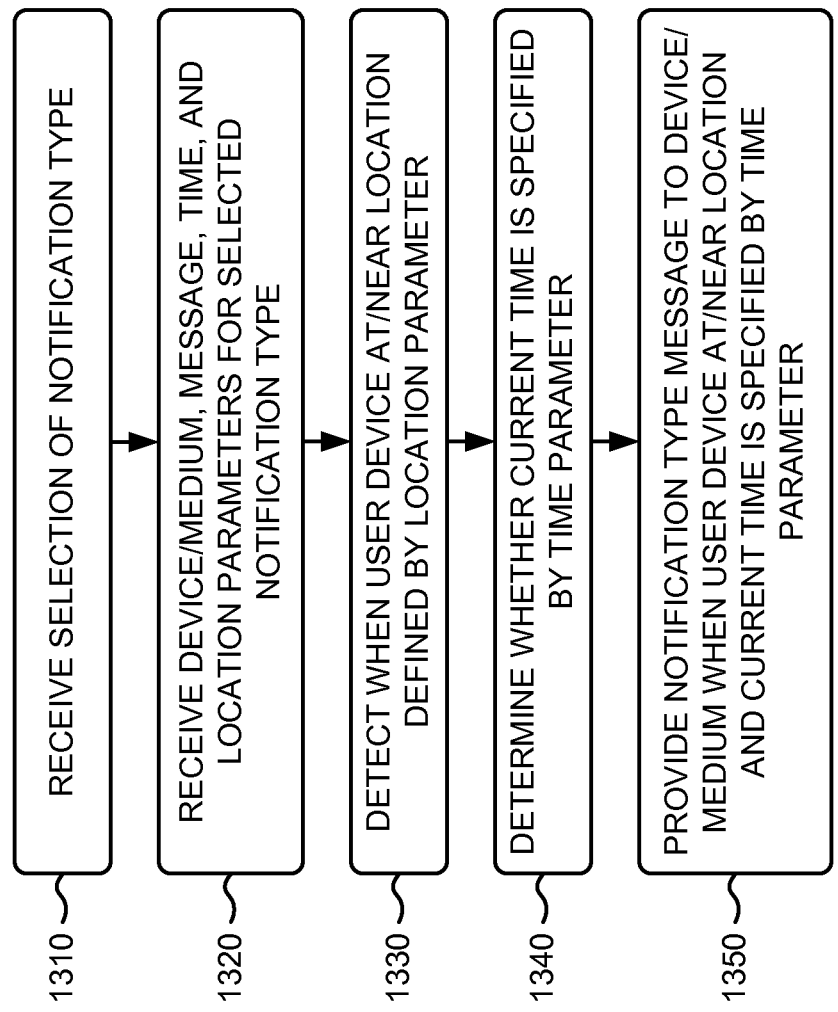
FIG. 13 is a flow chart of an example process for providing location-based proximity notifications according to an implementation described herein.

FIG. 13 is a flow chart of an example process 1300 for providing location-based proximity notifications according to an implementation described herein. In one implementation, process 1300 may be performed by user device 110. Alternatively, or additionally, some or all of process 1300 may be performed by another device or group of devices, including or excluding user device 110.

As shown in FIG. 13, process 1300 may include receiving selection of a notification type (block 1310), and receiving a device/medium parameter, a message parameter, a time parameter, and a location parameter for the selected notification type (block 1320). For example, in an implementation described above in connection with FIG. 5, user devices 110 may download a location-based proximity notification application from server 120, and the application may be installed on user devices 110. In one example, the application may include a mobile application that enables a user to create, via user device 110, a notification that is customized to particular devices and/or media based on a location of user device 110 and other notification parameters. The application may enable the user to select a type of notification to be provided, such as a SMS or a text message, a call to a landline phone, a call to a mobile device, an email message, a message provided to a STB and/or a television, a message provided to a gaming device or system, a post to a social network web site, etc. The application may enable the user to input notification parameters 510 to user device 110-1, and user device 110-1 may receive and store notification parameters 510. Alternatively, or additionally, the application may enable the user to provide, via user device 110-1, notification parameters 510 to server 120. Notification parameters 510 may include a device/medium parameter, a message parameter, a time or frequency parameter, a location parameter, etc.

As further shown in FIG. 13, process 1300 may include detecting when a user device is at or near a location defined by the location parameter (block 1330), and determining whether a current time is specified by the time parameter (block 1340). For example, in an implementation described above in connection with FIG. 5, the location parameter of notification parameters 510 may define second location 530 as a location when a notification should be generated. The device/medium parameter of notification parameters 510 may identify user device 110-2 as a device to receive the generated notification. When user device 110-1 moves to second location 530, user device 110-1 may detect that user device 110-1 is located at or near second location 530 at a current time (e.g., a time of a day, a day of the week, a particular date, etc.). User device 110-1 may determine whether the current time is specified by the time parameter of notification parameters 510. In one example, if the time parameter specifies a Monday and the current time is 11:30 AM on Monday, user device 110-1 may determine that the current time is specified by the time parameter.

Returning to FIG. 13, process 1300 may include providing a notification type message to the device/medium specified by the device/medium parameter and when the user device is at or near the location and the current time is specified by the time parameter (block 1350). For example, in an implementation described above in connection with FIG. 5, when user device 110-1 is at or near second location 530 and the current time is specified by the time parameter, user device 110-1 may provide notification message 540 to user device 110-2 via a medium (e.g., a text, a phone call, an email, etc.) specified by the device/medium parameter. Notification message 540 may include a message specified by the message parameter of notification parameters 510.

Figure 14:
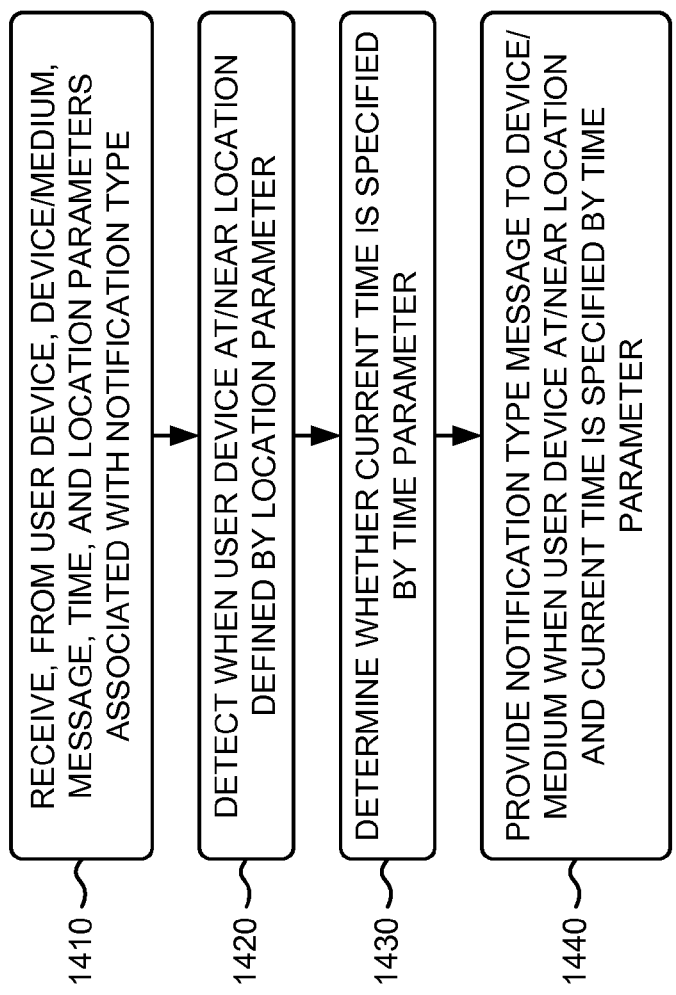
FIG. 14 is a flow chart of another example process for providing location-based proximity notifications according to an implementation described herein.

FIG. 14 is a flow chart of another example process 1400 for providing location-based proximity notifications according to an implementation described herein. In one implementation, process 1400 may be performed by server 120. Alternatively, or additionally, some or all of process 1400 may be performed by another device or group of devices, including or excluding server 120.

As shown in FIG. 14, process 1400 may include receiving, from a user device, a device/medium parameter, a message parameter, a time parameter, and a location parameter associated with a notification type (block 1410). For example, in an implementation described above in connection with FIG. 5, user devices 110 may download a location-based proximity notification application from server 120, and the application may be installed on user devices 110. In one example, the application may include a mobile application that enables a user to create, via user device 110, a notification that is customized to particular devices and/or media based on a location of user device 110 and other notification parameters. The application may enable the user to select a type of notification to be provided, such as a SMS or a text message, a call to a landline phone, a call to a mobile device, an email message, a message provided to a STB and/or a television, a message provided to a gaming device or system, a post to a social network web site, etc. The application may enable the user to provide, via user device 110-1, notification parameters 510 to server 120. Notification parameters 510 may include a device/medium parameter, a message parameter, a time or frequency parameter, a location parameter, etc.

As further shown in FIG. 14, process 1400 may include detecting when the user device is at or near a location defined by the location parameter (block 1420), and determining whether a current time is specified by the time parameter (block 1430). For example, in an implementation described above in connection with FIG. 5, the location parameter of notification parameters 510 may define second location 530 as a location when a notification should be generated. The device/medium parameter of notification parameters 510 may identify user device 110-2 as a device to receive the generated notification. When user device 110-1 moves to second location 530, server 120 may detect that user device 110-1 is located at or near second location 530 at a current time (e.g., a time of a day, a day of the week, a particular date, etc.). Server 120 may determine whether the current time is specified by the time parameter of notification parameters 510. For example, if the time parameter specifies Mar. 25, 2011 and the current time is 9:30 AM on Mar. 25, 2011, server 120 may determine that the current time is specified by the time parameter.

Returning to FIG. 14, process 1400 may include providing a notification type message to the device/medium specified by the device/medium parameter and when the user device is at or near the location and the current time is specified by the time parameter (block 1440). For example, in an implementation described above in connection with FIG. 5, when user device 110-1 is at or near second location 530 and the current time is specified by the time parameter, server 120 may provide notification message 550 to user device 110-2 via a medium (e.g., a social network post, a television message, etc.). Notification message 550 may include a message specified by the message parameter of notification parameters 510.

Systems and/or methods described herein may enable a user to create, via a user device, a notification that is customized to particular devices and/or media based on a location of the user device and other notification parameters. For example, the notification may be generated when the user device is at or near a particular location, such as within a particular number of miles of a location. The notification may be generated with a particular frequency, such as daily, at a particular time, as a one time event, etc., and may be coordinated with a calendar function provided by the user device. The notification may be in the form of a SMS or text message, a call to a landline phone, a call to a mobile device, an email message, a message provided to a STB and/or a television, a message provided to a gaming device or system, a post to a social network web site, an automatic call to a device, etc. The notification may be provided in a textual format, an audio format, and/or a video format to one or more devices, email addresses, and/or media.

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 13 and 14, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a mobile device, a location-based proximity notification application;
   presenting, by the mobile device and using the application, a first user interface to select a type of a location-based proximity notification from a group of types of location-based proximity notifications, wherein the group of types of location-based proximity notifications includes a message for display via a set-top box;
   receiving, by the mobile device and from a user via the first user interface, selection of a type of a location-based proximity notification;
   presenting, by the mobile device and based on receiving the selection of the type of the location-based proximity notification, a second user interface to solicit one or more parameters for the selected type of the location-based proximity notification, wherein the second user interface is selected from a group of different user interfaces for particular types of location-based proximity notifications, and wherein the group of different user interfaces includes a user interface for a message for display via the set-top box;
   receiving, by the mobile device and from the user via the second user interface:
      a medium parameter for a recipient medium associated with a recipient,
      a message parameter including a message to be provided,
      a time parameter including when the location-based proximity notification is to be generated, and
      a location parameter for generating the location-based proximity notification,
   wherein the location parameter indicates a particular amount of travel time to a location;
   detecting, by the mobile device, that the mobile device is within the particular amount of travel time to the location as defined by the location parameter; and
   sending, by the mobile device and using the application, the location-based proximity notification as defined by the message parameter, to the recipient medium as defined by the medium parameter, when the mobile device detects that a current time is within the time parameter and the mobile device is within the location parameter that indicates the particular amount of travel time to the location, wherein the location-based proximity notification indicates the particular amount of travel time to the location.

2. The method of claim 1, where the selected notification type includes one or more of:
   a text message,
   a call to a landline phone,
   a call to a mobile device,
   an email message,
   a message provided to a television,
   a message provided to a gaming device, or
   a post to a social network web site.

3. The method of claim 1, where the message parameter includes one or more of:
   a message in a textual format,
   a message in an audio format, or
   a message in a video format.

4. The method of claim 1, wherein presenting the second user interface to solicit one or more parameters for the selected type of the location-based proximity notification further includes presenting options for the medium parameter that include a set-top box (STB) identifier.

5. The method of claim 1, further comprising:
   storing, in a local memory of the mobile device, the medium parameter, the message parameter, and the location parameter for the selected notification type; and
   providing the medium parameter, the message parameter, and the location parameter to a server device.

6. A mobile device, comprising:
   a memory to store parameters for a notification message; and
   a processor to:
      present a first user interface to select a type of a location-based proximity notification from a group of types of location-based proximity notifications, wherein the group of types of location-based proximity notifications includes a message for display via a set-top box,
      receive, via the first user interface, selection of a type of a location-based proximity notification,
      present, based on receiving the selection of the type of the location-based proximity notification, a second user interface to solicit one or more parameters for the selected type of the location-based proximity notification, wherein the second user interface is selected from a group of different user interfaces for particular types of location-based proximity notifications, and wherein the group of different user interfaces includes a user interface for the message for display via the set-top box,
      receive, via the second user interface, a medium parameter for a recipient medium associated with a recipient, a message parameter including a message to be provided, a time parameter for the selected notification type, and a location parameter for generating the location-based proximity notification, wherein the location parameter indicates a particular amount of travel time to a location,
      determine global positioning system (GPS) coordinates of the mobile device,
      determine whether a current time is specified by the time parameter,
      determine, based on the GPS coordinates, whether the mobile device is within the particular amount of travel time defined by the location parameter, and
      send a proximity notification message, defined by the message parameter, to the recipient medium as defined by the medium parameter, when the mobile device determines that the mobile device is within the location parameter that indicates the particular amount of travel time to the location and when mobile device determines that the current time is specified by the time parameter, wherein the proximity notification message indicates the particular amount of travel time to the location.

7. The mobile device of claim 6, where the selected notification type includes one or more of:
   a text message,
   a call to a landline phone,
   a call to a mobile device,
   an email message,
   a message provided to a television,
   a message provided to a gaming device, or
   a post to a social network web site.

8. The mobile device of claim 6, where the message parameter includes one or more of:
   a message in a textual format,
   a message in an audio format, or
   a message in a video format.

9. The mobile device of claim 6, where the medium parameter for the recipient medium includes a set-top box (STB) identifier.

10. The mobile device of claim 6, where the processor is further to:
    store the medium parameter, the message parameter, a time parameter, and the location parameter in the memory, and
    provide the medium parameter, the message parameter, the time parameter, and the location parameter to a server device.

11. The method of claim 1, further comprising:
    determining a particular amount of travel time, of the mobile device, to the location defined by the location parameter.

12. The method of claim 1, wherein presenting the first user interface comprises:
    presenting a notification type selection interface to select one of multiple notification types;
    receiving a selection of a particular notification type from the notification type selection interface; and
    presenting, based on the receiving the selection, one of multiple parameters interfaces to solicit parameters applicable to the particular notification type.

13. The user device of claim 6, wherein the processor is further to:
    determine a particular amount of travel time, of the mobile device, to the location defined by the location parameter.

14. The user device of claim 6, wherein the processor is further to:
    present a notification type selection interface to select one of multiple notification types; receive a selection of a particular notification type from the notification type selection interface; and
    present, based on the receiving the selection, one of multiple parameters interfaces to solicit parameters applicable to the particular notification type.

15. A method, comprising:
    receiving, by a mobile device, a location-based proximity notification application;
    presenting, by the mobile device and using the application, a first user interface to select a type of a location-based proximity notification from a group of types of location-based proximity notifications, wherein the group of types of location-based proximity notifications includes a message for display via a set-top box;
    receiving, by the mobile device and via the first user interface, selection of a type of a location-based proximity notification;
    presenting, by the mobile device and based on receiving the selection of the type of the location-based proximity notification, a second user interface to solicit one or more parameters for the selected type of the location-based proximity notification, wherein the second user interface is selected from a group of different user interfaces for particular types of location-based proximity notifications, and wherein the group of different user interfaces includes a user interface for a message for display via the set-top box;
    receiving, by the mobile device and via the second user interface, a device parameter, a message parameter, a time parameter, and a location parameter for the selected notification type;
    detecting, by the mobile device, that the first user device is proximate to a location defined by the location parameter;
    determining that a current time is specified by the time parameter; and
    sending, by the mobile device and using the application, a proximity notification message, defined by the message parameter, to at least one of a recipient device or a server device providing a social network web site, as defined by the device parameter, in response to detecting that the mobile device is proximate to the location and determining that the current time is specified by the time parameter, wherein the proximity notification message indicates a particular amount of travel time to the location.

16. The method of claim 15, further comprising:
    determining a particular amount of travel time, of the mobile device, to the location defined by the location parameter.

17. The method of claim 15, wherein presenting the first user interface comprises:
    presenting a notification type selection interface to select one of multiple notification types;
    receiving a selection of a particular notification type from the notification type selection interface; and
    presenting, based on the receiving the selection, one of multiple parameters interfaces to solicit parameters applicable to the particular notification type.

* * * * *